(12) United States Patent
Matsueda et al.

(10) Patent No.: US 6,922,517 B2
(45) Date of Patent: Jul. 26, 2005

(54) QUICKLY BONDING OPTICAL FIBER ANCHOR DEVICE PERMITTING FIBERS TO REMAIN LINEAR

(75) Inventors: Yoshihiro Matsueda, Yokohama (JP); Ryo Kanda, Yokohama (JP); Mareto Sakaguchi, Yokohama (JP)

(73) Assignee: OCC Corporation, Yokohama (JP)

( * ) Notice: Subject to any disclaimer, the term of this patent is extended or adjusted under 35 U.S.C. 154(b) by 0 days.

(21) Appl. No.: 10/724,865

(22) Filed: Dec. 2, 2003

(65) Prior Publication Data

US 2004/0165853 A1 Aug. 26, 2004

(30) Foreign Application Priority Data

Dec. 4, 2002 (JP) .................................. 2002-352660

(51) Int. Cl.[7] .............................................. G02B 6/00
(52) U.S. Cl. ..................................... 385/136; 385/139
(58) Field of Search ................................. 385/136, 137, 385/139

(56) References Cited

U.S. PATENT DOCUMENTS

| | | | | |
|---|---|---|---|---|
| 4,237,474 A | * | 12/1980 | Ladany ........................ | 385/49 |
| 4,479,698 A | * | 10/1984 | Landis et al. ................. | 385/91 |
| 4,640,725 A | * | 2/1987 | Jones .......................... | 156/85 |
| 4,738,504 A | | 4/1988 | Jones ......................... | 350/96.2 |
| 4,790,626 A | | 12/1988 | Bonicel et al. ............ | 350/96.2 |
| 6,647,194 B1 | | 11/2003 | Kurosawa et al. | |

FOREIGN PATENT DOCUMENTS

| | | |
|---|---|---|
| GB | 2 252 572 | 8/1992 |
| JP | 2001-108840 | 4/2001 |
| JP | 2003-262742 | 9/2003 |

OTHER PUBLICATIONS

European Search Report mailed May 19, 2004 in corresponding foreign application No. EP 03027751.

* cited by examiner

*Primary Examiner*—Chandrika Prasad
(74) *Attorney, Agent, or Firm*—Westerman, Hattori, Daniels & Adrian, LLP

(57) ABSTRACT

An anchor device manufacturable at a low cost which is installed in a terminal connecting device for optical fibers of an optical cable using a loose tube type unit, and configured to anchor optical fibers by inserting a hot-melt type bonding agent having a form of a tube and a support rod having a form of an elongated rod into a hollow portion of a hollow heat-shrinkable tube, inserting terminal portions of a plurality of optical fibers inserted in an optical cable into a hole of the hot-melt type bonding agent, heating terminal portions of the optical fibers and reducing a diameter of a heat-shrinkable tube so that the hot-melt type bonding agent bonds the optical fibers and the support rod, and integrates the optical fibers and the support rod also with the heat-shrinkable tube to form an anchor portion after temperature drop, and fixing a calking sleeve fixed to a left end of the support rod to a fixed portion of the terminal connecting device.

8 Claims, 12 Drawing Sheets

QUICKLY BONDING OPTICAL FIBER ANCHOR DEVICE PERMITTING FIBERS TO REMAIN LINEAR

BACKGROUND OF THE INVENTION a) Field of the Invention

The present invention relates to an anchor device for terminals of optical fibers of an optical cable which uses a loose tube type unit or has a similar configuration and more specifically an anchor device preferably used for a submarine cable to which high tension is applied from outside.

b) Description of the Prior Art

There is a trend to use, instead of a tight type optical fiber unit which has been conventionally used as an optical fiber unit to be disposed in a center of a submarine cable, a loose tube type unit which has been developed for passing a larger number of optical fibers to meet a demand for a larger number of communication circuits.

Referring to FIG. 1A, FIG. 1B and FIG. 1C, description will be made of a difference between the tight type unit and the loose tube type unit.

As shown in FIG. 1A as a schematic sectional view, a tight type fiber unit 80 has a configuration in which a center high tensile strength body 80b such as a steel wire is disposed at a center of an optical fiber unit, several optical fibers 1a are filled and held around the center body 80b by way of urethane acrylate-based resin 80c, and an outer circumference is formed as a cover layer made of urethane acrylate-based resin which is hard at a certain degree.

A loose type unit 1 which is shown in FIG. 1B has a configuration in which a plurality of optical fibers 1a are inserted into a loose tube 1d made of extruded resin such as polybutylene terephthalate (PBT), polypropylene (PP) by way of a jelly like filler (compound) 1c.

In addition, the optical fibers 1a can be supplied also in a form of an optical fiber tape 1e which preliminarily restricts several optical fibers in a form of a tape as shown in an enlarged view E in FIG. 1C.

Then, description will be made of a configurational example of a submarine optical cable which uses the loose tube type unit referring to a perspective view shown in FIG. 2 and a sectional view taken perpendicularly to an axis of the cable shown in FIG. 3. In these drawings, a reference numeral 1 represents a loose tube type optical fiber unit and a reference numeral 2 designates a pressure-resisting layer for protecting the loose tube type unit 1 from a water pressure which consists of three divided pieces 2a having a sectorial section and made of a metal such as iron in FIG. 3.

A compound 7 having stickiness and glueability is filled between a loose tube 1d and an inside surface of the pressure-resisting layer 2 so that the loose tube 1d is restricted by way of the compound 7. A tensile strength body layer 3 which is composed by intertwisting a plurality of steel wires 3a is disposed around an outer circumference of the pressure-resisting layer 2 so as to sufficiently cope with a tensile force to be applied to the cable and the tensile strength body layer 3 is formed as a single layer in this example. A compound 8 is filled intermittently in a longitudinal direction in a space partitioned by an outer circumferential surface of the pressure-resisting layer 2, an inner circumferential surface of a metal tube layer 4 and an outer circumferential surface of a tensile strength wire 3.

The tensile strength layer 3 which is formed as the single layer in FIG. 2 is composed by intertwisting mainly steel wires so that the layer 3 can cope sufficiently with the tensile force to be applied to the cable.

The tensile strength body layer 3 consists of a single layer or a plurality of layers, affords tensile strength sufficiently bearable of a load to be applied at a cable laying stage and protects the cable from hindrance.

A reference numeral 4 represents a metal tube layer which maintains unity and airtightness of the above described tensile strength body layer 3, functions as a power feeder to a repeater and is formed as a tube usually by welding a metal tape made of copper, alminium or the like along the tensile strength layer so as to reduce a diameter.

Furthermore, reference numerals 5 and 6 denote insulating layers (sheaths) made of polyethylene or the like which are formed for insulation from sea water and mechanical protection.

A cable which has a configuration different from the above described configuration is also used as a tensile strength body layer. In an example shown as a perspective view and a sectional view shown in FIG. 4 and FIG. 5, a configuration of a pressure-resisting layer is changed. Speaking concretely, a pressure-resisting layer is composed so as to realize a pressure resisting shell around the outer circumference of the loose tube type unit 1 by competition between tensile strength wires which are intertwisted into two layers of an inner layer consisting of tensile strength wires 3a and an outer layer consisting of tensile strength wires 3b.

The compound 7 having the stickiness and glueability is filled between the outer circumferential surface of the loose tube type unit 1 and a curved surface on a side where the tensile strength wires 3a are opposed to the loose tube type unit 1 so that the pressure-resisting shell (substantially a shell having a diameter determined by inside surfaces of the tensile strength wires 3a) restricts the loose tube 1d.

The metal tube layer 4, and the insulating layers 5 and 6 which are disposed around the metal tube layer 4 are composed as those shown in FIG. 2 and FIG. 3.

Since such a submarine optical cable is usually laid between a continent and a continent or between a continent and an island, long cables are laid on a sea bottom by way of repeaters for relaying transmitted signals. Since it is necessary to connect the long cables to the repeaters and the long cables at a plurality of locations, optical, electrical and mechanical connection (the so-called anchoring) is required for this kind of submarine optical cables by connecting the optical fibers 1a and the metal tube layers 4 to one another and firmly fixing the so-called tensile strength bodies such as the divided pieces composing the above described pressure-resisting layer 2 and the tensile strength wires 3a and 3b composing the tensile strength body layer 3 so that the submarine cables can be laid under a deep sea and recovered from the deep sea.

As an anchor device for the loose tube type optical fibers, there is known an optical fiber anchor device which is configured to anchor optical fibers by forming an optical fiber anchor location of a bonding agent in a form of a tape, inserting these optical fibers in the form of the tape into a run-through hole of a shrinkable tube, integrating the fibers with the tube by heating, accommodating the shrinkable tube into a fixing member and fixing the fixing member (for example an optical fiber anchor device disclosed by Japanese Patent Kokai Publication No. 2001-108840).

The optical fiber anchor device disclosed by this publication is configured to anchor optical fibers by a lateral pressure of a shrinkable tube and a frictional force of a bonding agent.

Submarine optical cables are connected by way of terminal connecting devices. In the terminal connecting devices, connected portions of optical fibers are accommodated in pressure-resisting cylinders so that the cables function under a high pressure on a sea bottom. Since the pressure resisting cylinders have strength sufficiently bearable not only of a high pressure of sea water but also of tensile forces from cables on both sides, tensile forces of the submarine optical cables are transmitted to each other by way of the pressure-resisting cylinders in the terminal connecting devices.

In order to connect the submarine optical cables to these terminal connecting devices, the submarine optical cables are therefore anchored by fixing terminals such as the divided pieces 2a and the tensile strength wires 3a to the pressure resisting cylinders or members which are fixed to the pressure-resisting cylinders.

Since it is supposed that a maximum tension to be applied to each submarine cable is on the order of breaking loads of component members of the cable, it is desirable to anchor all the component members. Furthermore, a case is apt to occur where the component members are pulled into the cable by tension, it is necessary to firmly anchor the optical fiber itself to a fixed portion of the terminal connecting device.

Japanese patent Application No. 2002-63172 applied by the inventor proposed a method for anchoring an internal jelly-like filler and optical fibers simultaneously via a loose tube by twisting the loose tube around a drum-like anchor disk shown in FIG. 6A and a method for independently anchoring optical fibers in a loose tube using a bonding agent as shown in FIG. 6B.

FIG. 6A is a sectional view of a portion of a joint box (JB) 20 which is a kind of terminal connecting device taken along a plane including an axis line of a submarine optical cable.

A surface of a pressure-resisting cylinder 28 which is a main body of the JB 20 is covered with an insulating material 27. The pressure-resisting cylinder 28 is a cylinder made of a metal having high strength, and an anchor disk 11 is inserted into holes at centers of flat panels formed at both ends of the cylinder and held by the pressure-resisting cylinder 28 at color portions of the anchor disk 11.

A submarine optical cable 50 is inserted from a right side into a hole at a center of the insulating material 27. The submarine optical cable 50 is, for example, of a type which has the loose tube type unit shown in FIG. 2.

A metal tape layer 4 and insulating layers 5 and 6 are removed from the cable 50, divided pieces 2a composing a pressure-resisting layer 2 and a tensile strength wires 3a composing a tensile strength body layer 3 are disposed in a tapered hole at a center of the anchor disk 11 in spread conditions and clamped by pressing in a tapered pin 13. For positioning, the tapered pin 13 is pressed with a clamp nut 15 by way of a flange 14.

A tensile force applied to the cable 50 is transmitted from the divided pieces 2a and the tensile strength wires 3a to the pressure-resisting cylinder 28 by way of the anchor disk 11 and the tapered pin 13, and further to a cable (not shown) connected to a left end.

A reference numeral 60 used in FIG. 6A represents an optical fiber anchor device which anchors a loose tube and optical fibers at the same time. A loose tube type unit 1 of the cable 50 is passed through the tapered pin 13, the flange 14 and a run-through hole of the clamp nut 15, is guided by a wrapping guide 16 and attains to an interior of the pressure-resisting cylinder 28. In the pressure-resisting cylinder, a nearly cylindrical winding disk 61 is fixed to a base plate 62 fixed to the pressure-resisting cylinder 28, and the loose tube type unit 1 is wound several turns around a cylindrical outer circumferential surface of the winding disk 61 and an end of the lose tube type unit 1 is fixed to the base plate 62 with a terminal fixing implement 63.

A force exerted from the terminal fixing implement 63 to the loose tube type unit 1 is expanded by a frictional force of a twisted portion of the loose tube type unit 1 wound around the outer circumference of the winding disk and anchors the loose tube type unit 1, and the internal optical fibers 1a are also anchored by frictional force of the charged jelly-like filler 1c.

On the other hand, an optical fiber anchor device 70 shown in FIG. 6B is an anchor device using a bonding agent and disposed at a location which is substantially the same as a location of an optical fiber anchor device 60 shown in FIG. 11A. Divided pieces 2a and tensile strength wires 3a are anchored similarly to those shown in FIG. 6A and a loose tube type unit 1 is led linearly into a pressure-resisting cylinder 28.

A loose tube 1d of the loose tube type unit 1 is anchored to a loose tube bonding implement 72 with a bonding agent or the like.

Then, the loose tube 1d is removed from the loose tube type unit 1, optical fibers 1a are taken out, a jelly-like filler 1c is wiped off, and the optical fibers 1a are arranged in grooves in a bonding implement 73 and bonded to the grooves with a bonding agent. Used as the bonding agent is epoxy resin or UV curable type resin.

In order to reduce a number of component members of a submarine optical cable, it is proposed to configure an inner circumferential surface of a pressure-resisting shell to have a function of a loose tube.

For example, FIG. 7 is a perspective view showing two kinds of configurations of submarine optical cables which use no loose tube but have optical fiber accommodating structures in functions equivalent to that of the loose tube type unit.

In a first configuration shown in FIG. 7, a cylindrical pressure-resisting layer 2 is composed by combining divided pieces 2a having sectorial sections, a compound 7 is applied densely to a gap formed by the divided pieces 2a, optical fibers are inserted into an internal space in the divided pieces 2a and a jelly-like filler 1c is filled densely in the gap. A loose tube for composing the loose tube type unit is replaced with the pressure-resisting layer 2 and the compound 7, whereby the loose tube itself is not present.

An example shown in FIG. 7 uses no loose tube, but has a space corresponding to an inner circumferential surface of a loose tube, allows optical fibers 1a and the jelly-like filler 1c to be passed and filled into the space and has a function to hold the optical fibers 1a which is the same as that of the loose tube type unit.

Since a terminal connecting device used to connect a submarine cable must be compact taking its mechanical and handling characteristics, etc. into consideration, compactness is required also for an anchor device for tensile strength body of the cable. A cable anchor device must also be compact since optical cables must be handled so as not to apply unreasonable mechanical tension to connected optical fibers and a excess length accommodating body for accommodating excess lengths of optical fibers and the like are disposed in a pressure-resisting cylinder.

A diameter of the winding disk used in the conventional example is restricted by an allowable radius of curvature which does not degrade a transmission characteristic of the optical fibers. Also in a case where the optical fibers are to be bonded linearly with a bonding agent, the optical fibers must be bonded for a pretty long distance for anchoring the optical fibers securely. Furthermore, the winding disk and the optical fiber bonding implement which are to be accommodated in the pressure-resisting cylinder tend to involve the problem of enlarging the pressure-resisting cylinder.

Furthermore, when it is expected to bond the optical fibers completely with an ordinary bonding agent, a curing time of 8 hours or longer will be required.

Any of the conventional methods involves problems to prolong a working time, enhance a price of equipment, require materials at high cost prices and the like all of which result in enhancement of a manufacturing cost.

Furthermore, it is evident that an optical fiber anchor device which has a configuration similar to that shown in FIG. 6A which anchors optical fibers indirectly with a loose tube is not applicable to a submarine optical cable which is configured to exhibit an effect of a loose tube type unit without using a loose tube.

Furthermore, in a case where optical fibers are anchored by bonding portions of optical fibers into a form of a tape with a bonding agent, inserting the optical fibers in the form of a tape into a run-through hole of a shrinkable tube, integrating the optical fibers by heating and accommodating the shrinkable tube into a fixed member, the tube in which the optical fibers are inserted is shrunk at a location supposed to be attached to the fixed member and the location for attachment must be selected so as to avoid excess loosening or tension of the optical fibers, thereby posing problems of making it difficult to select a location of attachment of the shrinkable tube, requiring a long time to cure the bonding agent for bonding the optical fibers into the form of the tape with the bonding agent, allowing a lateral pressure to degrade a transmission characteristic of the optical fibers when the shrinkable tube is fixed by a mechanical method such as holding the optical fibers with the fixed member at a stage to accommodate the shrinkable tube into the fixed member or the like.

SUMMARY OF THE INVENTION

An object of the present invention is to configure the above described optical fiber anchor device compact, shorten a working time and further provide an optical fiber anchor device applicable also to optical cables having a simple configuration using no loose tube.

In order to solve the above described problems, the present invention provides an optical fiber anchor device installed in a terminal connecting device for connecting an optical cable having a loose tube type unit in which a single optical fiber or a plurality of optical fibers is or are inserted into a cylindrical tube made of a metal or resin together with a jelly-like filler and used for anchoring the single optical fiber or the plurality of optical fibers inserted into the above described optical cable, comprising a hot-melt type bonding agent in a form of a tube having a hollow portion and a heat-shrinkable tube in a form of a tube having a hollow portion, and characterized in that the hot-melt type bonding agent is inserted into the hollow portion of the heat-shrinkable tube, at least an optical fiber is inserted into the hollow portion of the hot-melt type bonding agent and heated, an anchor portion is formed by melting the hot-melt type bonding agent and shrinking the heat-shrinkable tube so as to be integrated with the optical fiber and form an anchor portion and an end of the anchor portion is held by a fixed portion of the terminal connecting device, thereby anchoring the optical fiber.

Furthermore, the present invention provides an optical fiber anchor device installed in a terminal connecting device having a loose tube type unit for connecting an optical cable in which a single optical fiber or a plurality of optical fibers is or are inserted into a cylindrical tube made of a metal or resin together with a jelly-like bonding agent and used for anchoring the single optical fiber or the plurality of optical fibers inserted into the above described optical cable, comprising a hot-melt type bonding agent in a form of a tube having a hollow portion, a heat-shrinkable tube in a form of a tube having a hollow portion and a support rod, and characterized in that the hot-melt type bonding agent is inserted into the hollow portion of the heat-shrinkable tube, the support rod is disposed on the hollow portion, a solid portion or an outer circumferential portion of the hot-melt type bonding agent, at least an optical fiber is inserted into the hollow portion of the hot-melt type bonding agent and heated, an anchor portion is formed by melting the hot-melt type bonding agent and shrinking the heat-shrinkable tube so as to be integrated with the optical fiber and holding an end of the support rod by a fixed portion of the terminal connecting device, thereby anchoring the optical fiber.

Furthermore, the anchor portion of the optical fiber anchor device according to the present invention has a length of 30 to 100 mm.

Furthermore, the hot-melt type bonding agent is preliminarily inserted into the hollow portion of the heat-shrinkable tube and is joined to the heat-shrinkable tube to form an integral body.

Furthermore, the support rod is preliminarily fixed to the solid portion of the hot-melt type bonding agent or disposed on an outer circumferential portion of the hot-melt type bonding agent.

Furthermore, the hot-melt type bonding agent is preliminarily applied to an outer circumferential portion of the support rod.

Furthermore, a support sleeve (calking sleeve) is fixed to an end of the support rod which is to be fixed to the terminal connecting device and the support rod is held by the terminal connecting device by way of the support sleeve.

Moreover, convexities and concavities are formed on an outer circumferential surface of a portion of the support rod to be fixed to the hot-melt type bonding agent.

DETAILED DESCRIPTION OF THE PREFERRED EMBODIMENTS

Figure 8A:
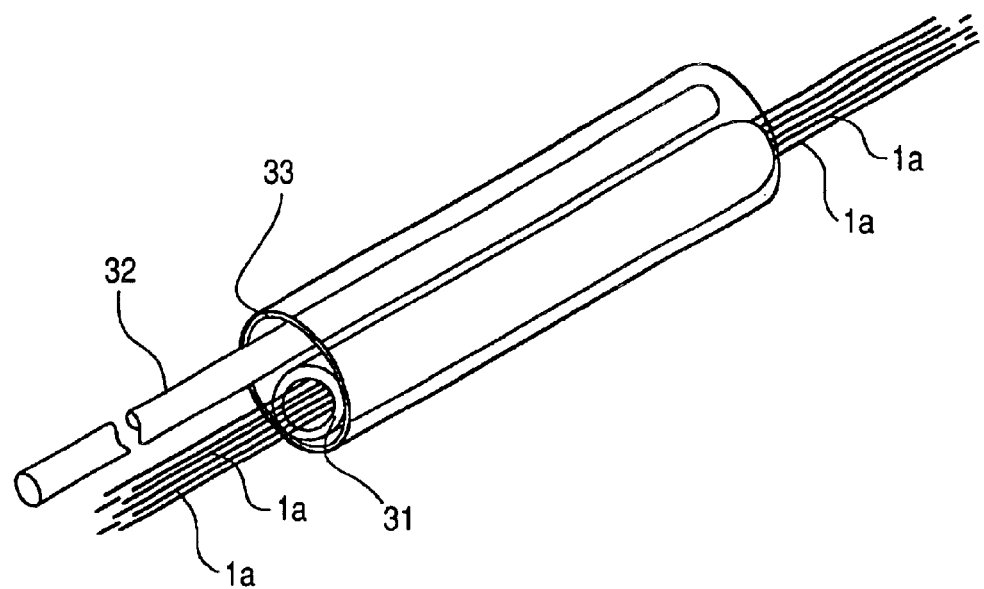
FIGS. 8A and 8B are perspective views illustrating conditions before and after heating of an embodiment of the optical fiber anchor device according to the present invention.
Figure 8B:
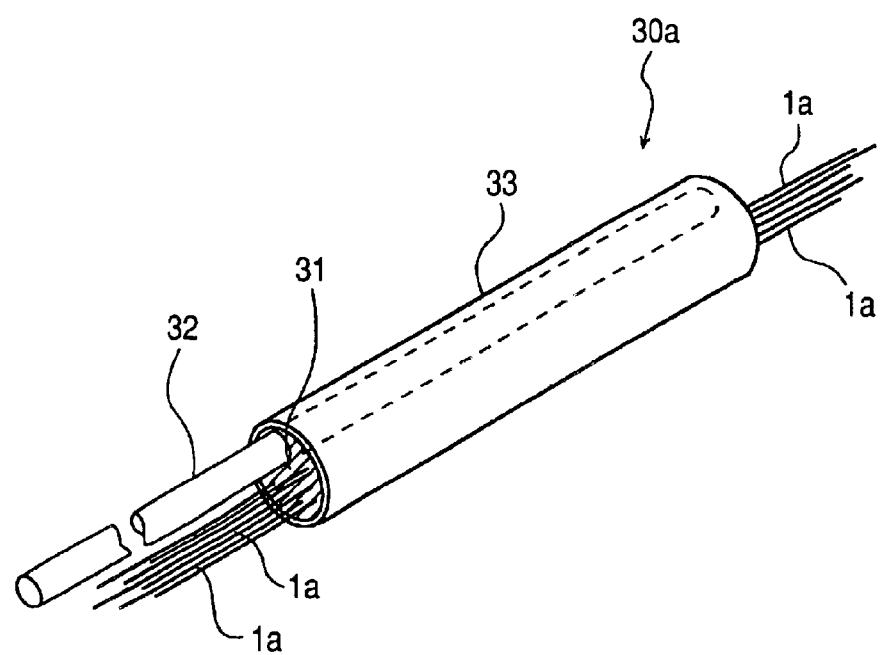
Figure 9A:
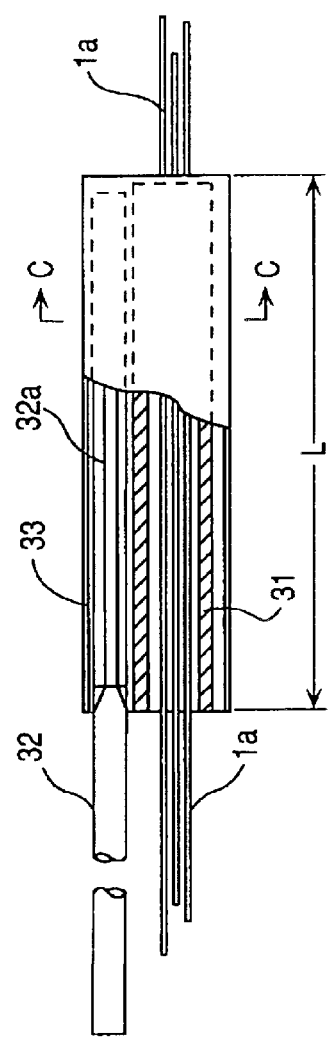
FIGS. 9A, 9B, 9C and 9D are projected plans shown as sectional views of the embodiment of the present invention shown in forms of the perspective views in FIGS. 8A, 8B and 8C.
Figure 9B:
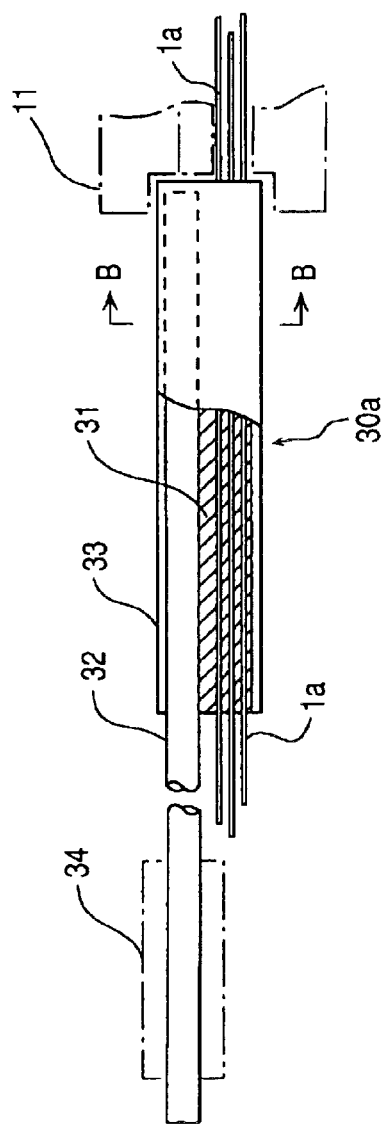
Figure 9C:
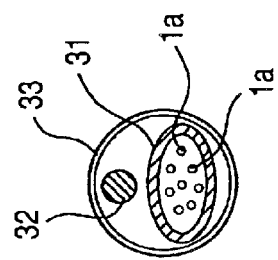
Figure 9D:
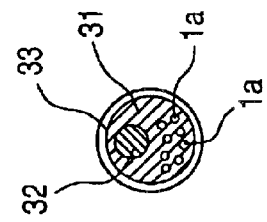

An optical fiber anchor device according to an embodiment of the present invention is illustrated in FIGS. 8A, 8B, 9A, 9B, 9C and 9D. FIGS. 8A and 8B are perspective views illustrating an anchor portion 30a which is a main portion of an optical fiber anchor device 30: FIG. 8A showing a condition of the anchor portion 30a before heating and FIG. 8B showing a condition after the heating where the anchor portion 30a is completed as such. FIGS. 9A, 9B, 9C and 9D are sectional views taken along a plane including an axis line of an optical fiber and a plane perpendicular to the axis line: FIGS. 9A and 9C showing the condition before the heating and FIGS. 9B and 9D showing the condition after the heating.

In the anchor portion 30a, a tube-like hot-melt type bonding agent 31 having a nearly ellipsoidal section and an elongated support rod 32 are inserted into a hollow portion of a hollow heat-shrinkable tube 33 having a nearly circular section.

The heat-shrinkable tube 33 and the hot-melt type bonding agent 31 have lengths which are to be a length L of the anchor portion shown in FIG. 9A after the heating.

In addition, a right side and a left side in the drawings are a side of an optical cable and a connecting side of a terminal connecting device.

The support rod 32 is composed, for example, of a metal wire such as a stainless steel wire. In order to strengthen a restricting force exerted from the hot-melt type bonding agent 31 and the heat-shrinkable tube 33 in an axial direction of the support rod 32 after the heating, concavities and convexities may be formed by threading on a surface of the support rod 32 shown in FIG. 9A. After the heating, a thread of the support rod 32 is restricted by the hot-melt type bonding agent filled in a thread groove, thereby preventing a movement in the axial direction. So far as the restricting force exerted in the axial direction of the support rod 32 is strengthened, the concavities and convexities may be a large number of rings or irregular grooves or the like other than the thread.

An end of the support rod 32 (on the right side in FIG. 9) is nearly aligned with an end of the heat-shrinkable tube 33 and the other end (on the left side in FIG. 9A) is prolonged for a predetermined distance to attach a calking sleeve 34 which is a support sleeve for anchoring the support rod described later.

Figure 7:
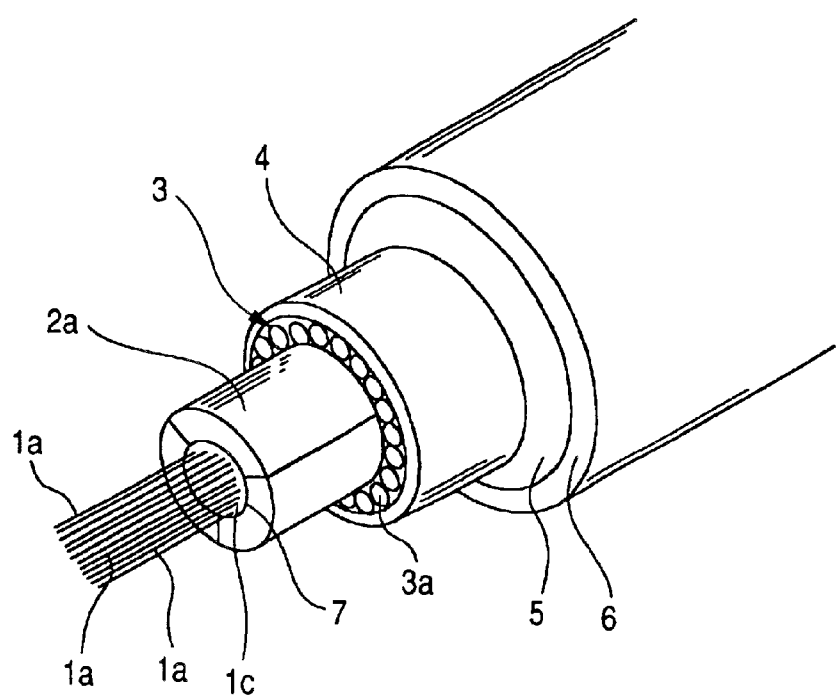
FIG. 7 is a perspective view illustrating two kinds of submarine optical cables which have no loose tube but use pressure-resisting shells having a function of a loose tube.

Terminal portions of a plurality of optical fibers 1a taken out of an optical cable are inserted into a hole of the hot-melt type bonding agent 31. When the optical fibers 1a are optical fibers in the loose tube type unit shown in FIG. 2 and FIG. 3, for example, the optical fibers are inserted after removing a loose tube 1d and wiping off a jelly-like compound 1c. When the loose tube shown in FIG. 7 is not used, the optical fibers are to be pulled through a pressure-resisting layer or a pressure-resisting shell and inserted after wiping off the jelly-like compound 1c.

Leading end portions of optical fibers which are on a connection side have lengths sufficient for a connecting work.

In addition, insulating layers (sheaths) 5 and 6 which compose an outer circumferential portion of a submarine optical cable are removed as shown in FIGS. 11A, 11B and 11C or FIG. 6A which are described detailedly later, and component members of a pressure-resisting layer 2 and a tensile strength layer are anchored separately.

In the condition before the heating shown in FIG. 8A and FIG. 9A, the plurality of optical fibers 1a are inserted reasonably into the hole of the hot-melt type bonding agent 31, and the hot-melt type bonding agent 31 and the support rod 32 are inserted reasonably into the hole of the heat-shrinkable tube 33 as shown in FIG. 9C illustrating a sectional view. At this stage, the component members are not coupled with one another and in a condition where the members can be moved individually when an external force is exerted.

When the heat-shrinkable tube 33 is heated using a heater (not shown), the hot-melt type bonding agent is softened and melted, and flows into gaps formed among the optical fibers 1a and the support rod 32, and portions of the heat-shrinkable tube 33 are shrunk and a diameter of the tube is shortened in particular due to heating.

As shown in FIGS. 8A, 8B, 9B and 9D, the hot-melt type bonding agent which is filled around the optical fibers 1a and the support rod 32 with no gap is filled into the hole of the heat-shrinkable tube 33 which has the shortened diameter.

When a temperature is lowered after the heating is stopped, the hot-melt type bonding agent 31 is solidified and bonds the optical fibers 1a and the support rod 32, thereby integrating the optical fibers 1a and the support rod with the heat shrinkable tube 33 to form the anchor portion 30a.

Since a volumetric change of the hot-melt type bonding agent 31 is negligible, preliminary adjustments of an internal volume of the hole of the heat-shrinkable tube 33 and a volume of the hot-melt type bonding agent 31 after shrinkage makes it possible to obtain a sufficient bonding force without allowing a transmission characteristic of the optical fibers to be abnormalized due to an external pressure after the shrinkage.

Primary and secondary resin coatings are applied to cores of the optical fibers 1a and a glass material which composes a cladding as described above mainly for protection from external forces and enhancing mechanical strength.

Though heat-curing type silicone resin, ultraviolet UV-curing type acrylic resin, epoxy resin or the like is used for a primary sheath and the UV-curing resin, nylon or the like is used for a secondary sheath, there has recently been a tendency to use the UV-curing resin frequently.

As the hot-melt type bonding agent 31, EVA (ethylene-vinyl acetate copolymer) and others are put to practical use with thermoplastic resin as a base. The hot-melt type bonding agent is melted by heating with a heater. Since melted resin has a viscosity which is lowered to a certain degree, the resin is filled easily into the gaps among the optical fibers 1a and the support rod 32 as described above. When a temperature is lowered after stopping the heating with the heater, the resin is solidified and bonded as it is in a filled condition.

The resin which is adopted as the hot-melt type bonding agent 31 uses the thermoplastic resin as the base as described above and is quite different from UV-curing resin or the like of a series of heat-curing type resin which is used as a sheath of optical fibers.

Thermoplastic silicone rubber or the like is known well as a material of the heat-shrinkable tube 33. The silicone rubber which is excellent in heat resistance and cold resistance is usable with no remarkable degradation of its characteristic within a wide range from −70 to 200° C. As special silicone rubber, autohesive or heat-shrinkable silicone rubber is used as a heat-resistant insulating tape or a heat-shrinkable tube.

The heat-shrinkable tube is adopted also for bundling wires for panel-to-panel wiring in electronic appliances and used in a shrunk condition while being exposed to an external hot wind from a heater or the like. The heat-shrinkable tube is used also as a sheath for connected portions of optical fibers.

The heat-shrinkable tube 33 is shrunk by the heating and the optical fibers 1a are bonded to the support rod 32 by melting the hot-melt type bonding agent 31, whereby these members are integrated to form the anchor portion 30a.

It is usually convenient to fix a calking sleeve 34 (traced in a chain line) in the vicinity of a leading end of the support rod 32 as shown at a left end in FIG. 9B and anchor the supporting body 32 to a pressure-resisting cylinder or an equivalent member of the terminal connecting device by way of the calking sleeve 34.

In addition, an anchoring method using the calking sleeve 34 will be detailed later.

Figure 10:
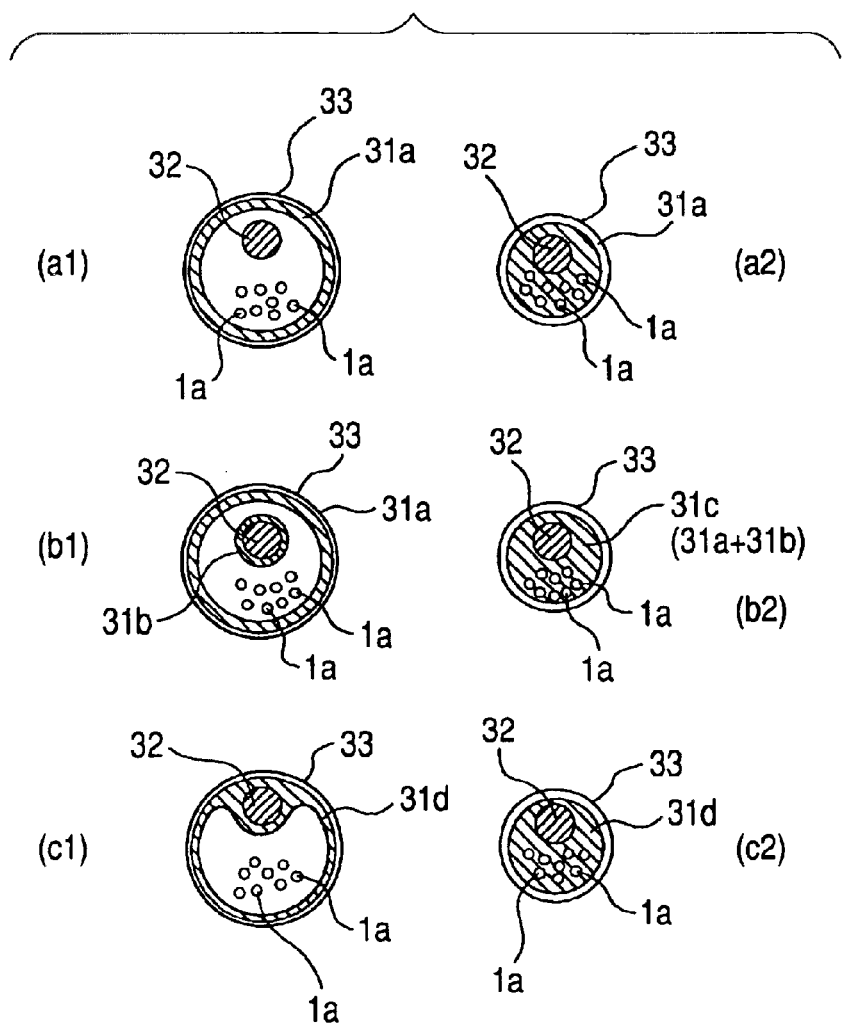
FIG. 10 is a sectional view of an optical fiber anchor device according to another embodiment of the present invention taken in a direction perpendicular to an axial line of an optical fiber.

Since the anchor portion 30a has nearly no force for integrating the component members before the heating, the members may be mis-positioned from one another during a heating work. In FIG. 10, mainly a sectional shape of the hot-melt type bonding agent 31 is changed to improve a working property.

FIG. 10(a1), (b1), (c1) are sectional views of the anchor portion 30a before the heating taken perpendicularly to an axial line of the optical fibers 1a and FIG. 10(a2), (b2), (c2) are sectional views of the anchor portion 30a formed by integration after the heating taken perpendicularly to the axial line.

In addition, FIG. 10(a2), (b2) and (c2) show a condition which is the same at that shown in FIG. 9.

In a condition shown in FIG. 10(a1) where a hot-melt type bonding agent 31a is inserted into a heat-shrinkable tube 33 before being heated and lightly bonded to the tube, the hot-melt type bending agent is integrated with the heat-shrinkable tube 33. The optical fibers 1a and the support rod 32 are inserted into a hole of the hot-melt type bonding agent 31a. When the hot-melt type bonding agent 31a is solidified after being heated and melted by the heating, the bonding agent 31a is filled between the optical fibers 1a and the support rod 32 as shown in FIG. 10(a2).

In FIG. 10(b1), a surface of the support rod 32 is preliminarily covered with a hot-melt type bonding agent 31b to securely avoid direct contact between concavities and convexities formed on the surface of the support rod 32 and optical fibers 1a. A total sum of sectional areas of the hot-melt type bonding 31a having a cylindrical section and the hot-melt type bonding agent 31b on the surface of the support rod is a predetermined amount of the hot-melt type bonding agent. The hot-melt type bonding agent 31a is inserted into the heat-shrinkable tube 33 before the heating and lightly bonded as shown in FIG. 10(a1).

In an embodiment shown in FIG. 10(c1) having a highest working property, the support rod 32 is preliminarily embedded and fixed in a solid portion of a hot-melt type bonding agent 31d, and the hot-melt type bonding agent 1d is inserted into the heat-shrinkable tube 33 before the heated and lightly bonded.

In this case, a positional relation between the optical fibers 1a and other members can be automatically determined by inserting the optical fibers 1a into a hole of the hot-melt type bonding agent 31d and positioning the optical fibers 1a.

Then, detailed description will be made of a terminal connecting device to be used for connecting submarine cables referring to FIGS. 11A, 11B and 11C. Terminal connecting devices are classified into kinds of JB, CPL, EB and the like, each of which is used for connecting cables mechanically, electrically and optically. Speaking concretely, each kind of terminal connecting device is used for connecting optical fibers to a power supply circuit, anchoring tensile strength bodies and the like, and transmission of tension between cables. Description will be made here of a joint box (JB) used for connecting two submarine cables.

Figure 11A:
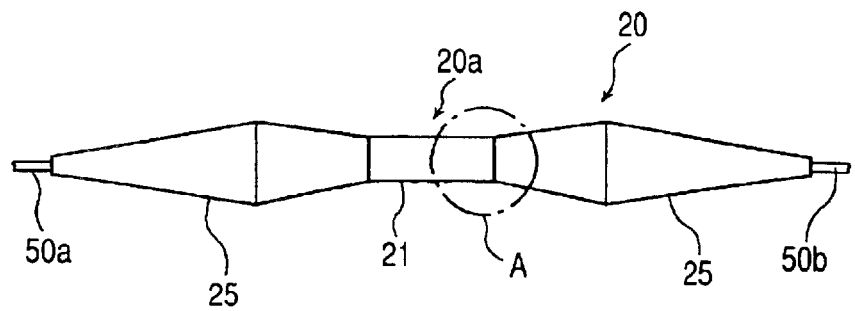
FIGS. 11A, 11B and 11C are sectional views illustrating an example of anchoring method for a joint box (JB) using the optical fiber anchor device according to the present invention and a support rod.

FIG. 11A shows an external form of the joint box as a projected plan, and submarine optical cables 50a and 50b which are inserted from left and right sides pass through center holes of boots 25 and led into a JB main body 20a in the middle.

The submarine optical cables 50a and 50b are connected mechanically, electrically and optically by the JB main body in a cylindrical cover 21 at a center. The JB main body 20a has an internal configuration which may be considered nearly symmetrical with regard to a right-to-left center and an interior of a circle A corresponding to a right half is shown in FIG. 11B as a sectional view taken along a plane including an axial line of the optical cable.

Since the submarine cables 50a and 50b are connected and anchored by methods which are the substantially the same and have configurations which are similar to each other, a portion of an anchor device corresponding only to the cable 50b is illustrated. It will be considered that a configuration for the cable 50a is substantially in a symmetrical relation to FIG. 11B.

Figure 1A:
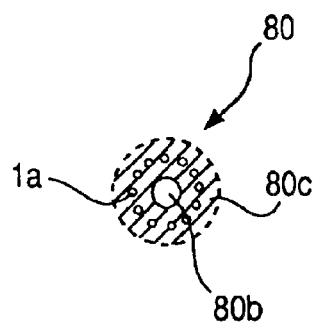
FIGS. 1A, 1B and 1C are schematic diagrams descriptive of a type of an optical fiber unit to be disposed in a center of a submarine optical cable.
Figure 1B:
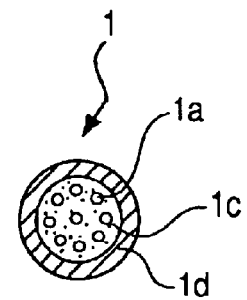
Figure 1C:
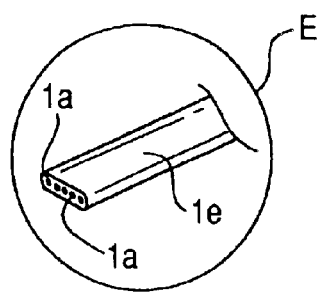
Figure 2:
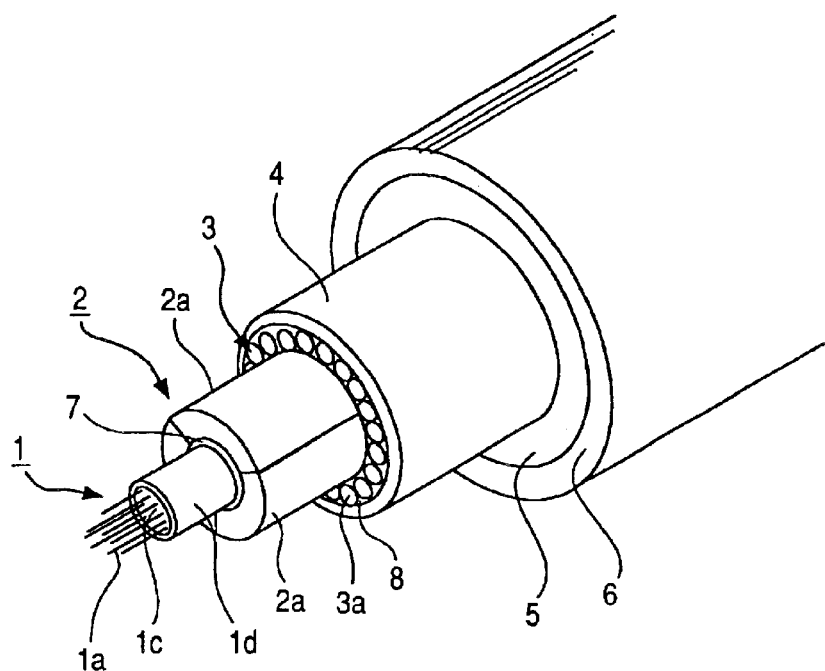
FIG. 2 is a perspective view illustrating an internal configuration of the submarine optical cable.
Figure 3:
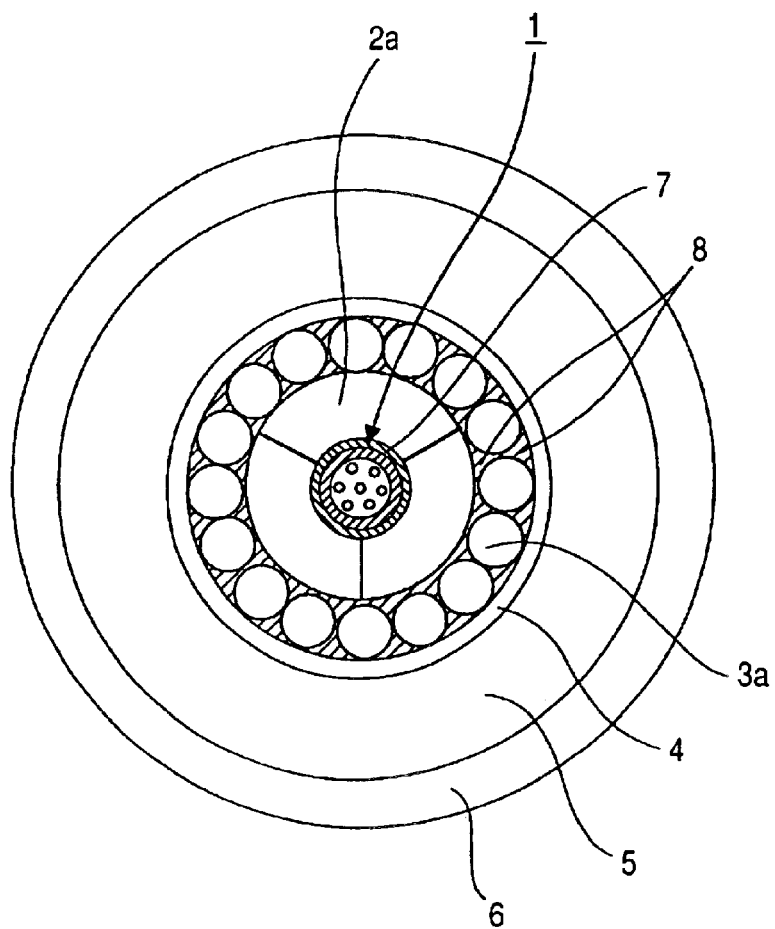
FIG. 3 is a sectional view taken in a direction perpendicular to a longitudinal direction of the submarine optical cable shown in FIG. 2.
Figure 4:
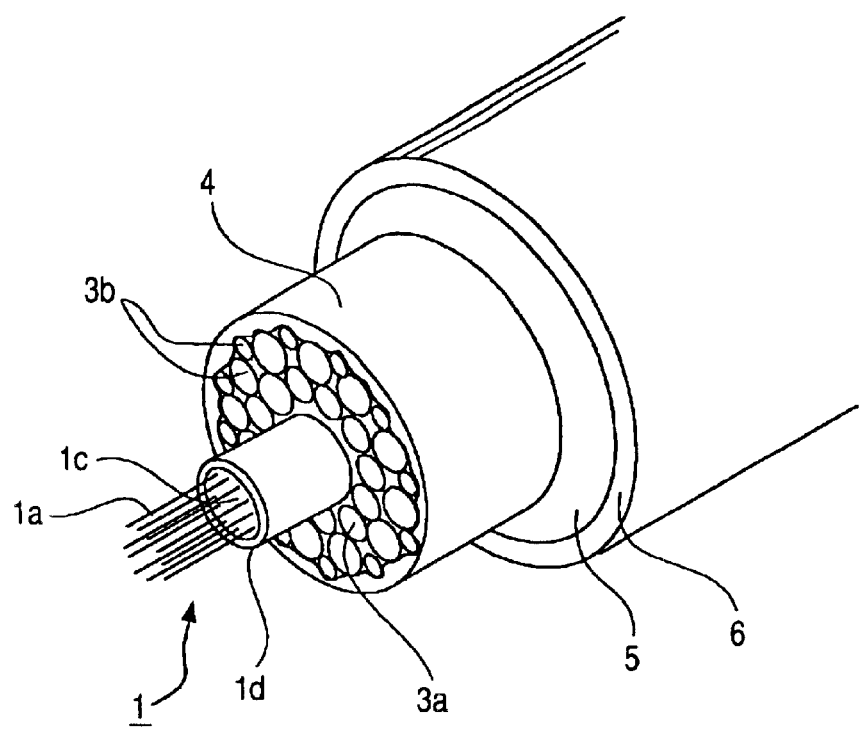
FIG. 4 is a perspective view illustrating an internal configuration of a submarine optical cable which has a configuration different from that shown in FIG. 2.
Figure 5:
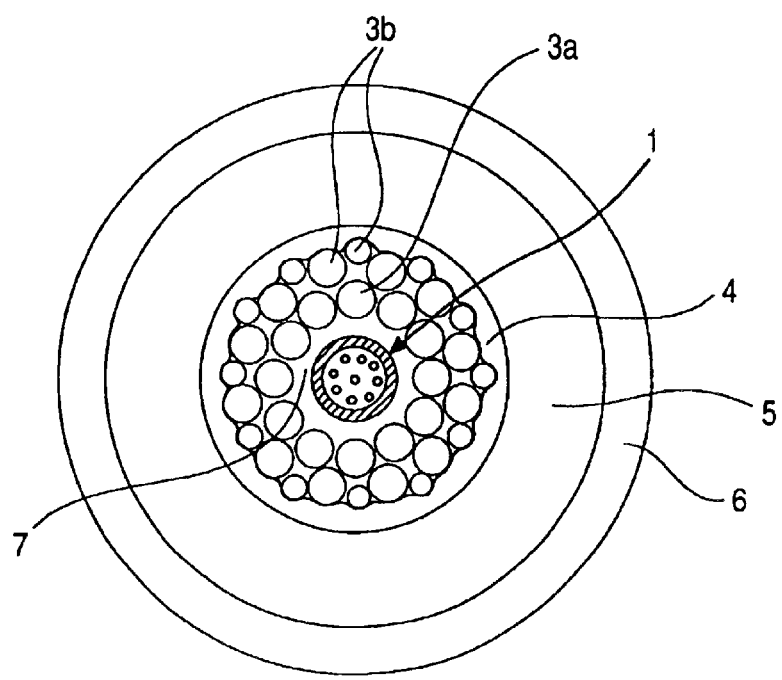
FIG. 5 is a sectional view taken in a direction perpendicular to a longitudinal direction of the submarine optical cable shown in FIG. 4.
Figure 6A:
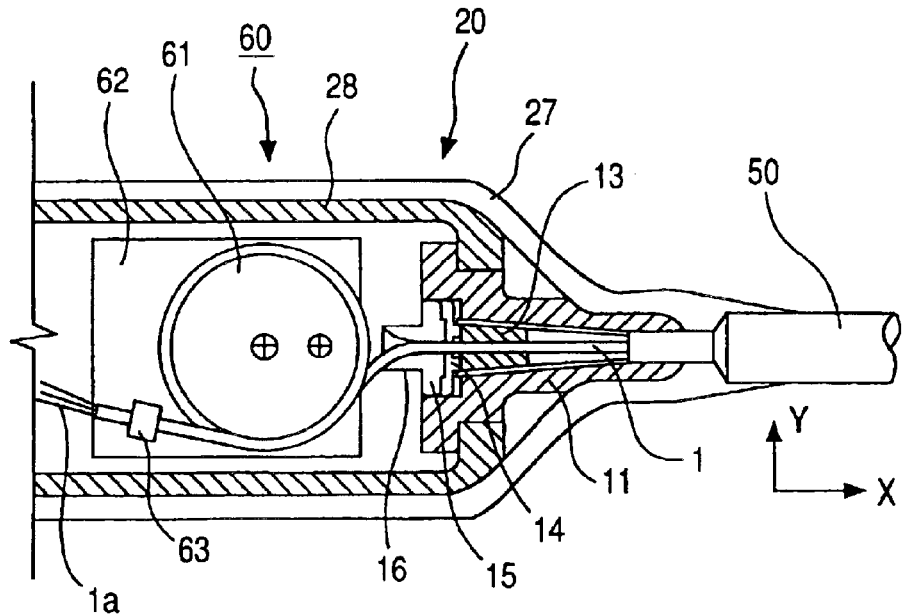
FIG. 6 shows a conventional example of a method for anchoring an optical cable in a loose tube.
Figure 6B:
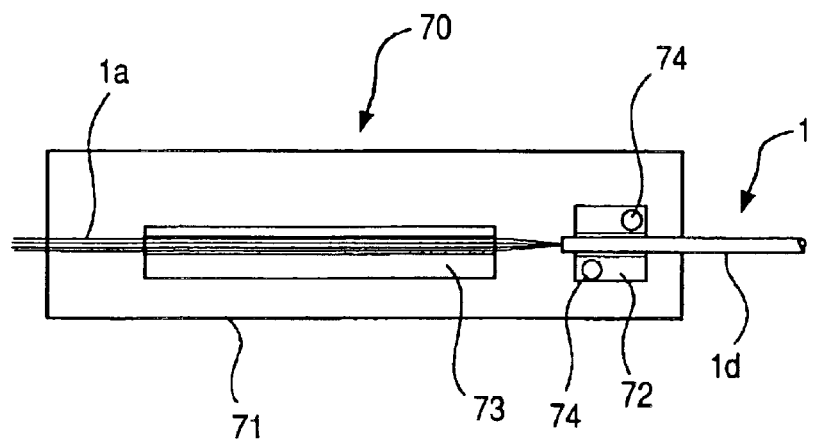

The submarine cables 50a and 50b will be described, for example, as cables which have the loose tube type unit shown in FIG. 2, but the optical fiber anchor device according to the present invention is applicable also to the cable which uses the pressure-resisting layer or the pressure-resisting shell functioning also as a loose tube.

The boots 25 made of rubber or the like and internal boot inserts 26 protect the optical cables 50a and 50b from external forces and can be wound up around a reel together with the connected optical cables.

Figure 11B:
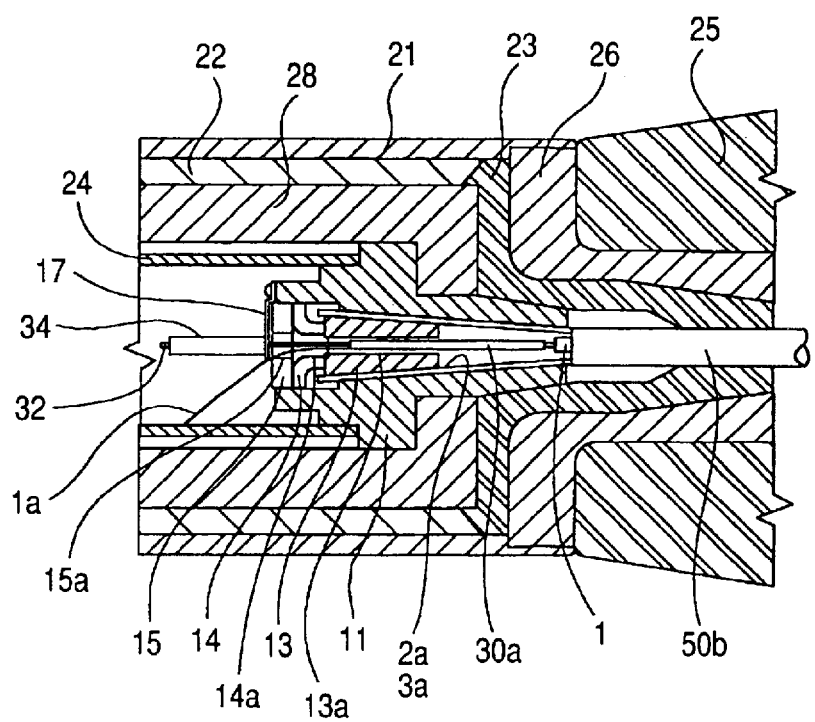

In FIG. 11B, the cable 50b is inserted into a center hole of a mold 23 in a condition where insulating layers 5 and 6 are removed from the cable.

Description will be made of a configuration of the JB main body 20a.

An anchor disk 11 is inserted into center holes of end plates formed at both ends of a cylindrical pressure-resisting cylinder 28 made of a metal.

The pressure-resisting cylinder 28 protects connected portions of optical fibers accommodated therein from external forces such as a water pressure, a flexing force and the like, transmits tension between the connected optical cables 50a and 50b, and electrically connects a power supply circuit. The pressure-resisting cylinder 28 is therefore made of a metal having high strength, and a circumference of the cylinder is covered with an insulating material 22 and a mold 23 for insulation from sea water.

The pressure-resisting cylinder 28 is further covered with a cylindrical cover 21 made of a metal and the boot inserts 26 are coupled with both ends of the cover 21 by screwing or the like.

The connected portions of the optical fibers 1a of the two optical cables 50a and 50b which are to be accommodated in the pressure-resisting cylinder 28 must have a pretty long surplus length, or excess lengths for a connecting work. For accommodating the optical fibers with no degradation of a transmission characteristic, a excess length accommodating body 24 for accommodating the optical fibers 1a is disposed on an inside of the pressure-resisting cylinder 28.

Divided pieces 2a, steel wires (tensile strength wires) 3a, 3b and the like are mounted on a tapered inner circumferential surface of the anchor disk 11 so as not to be overlapped and anchored by clamping between the inner circumferential surface and an outer circumferential surface of a taper pin 13.

The taper pin 13 which is pushed in from left by way of a flange 14 firmly anchors the divided pieces 2a and the steel wires (tensile strength wires) 3a and 3b. The taper pin 13 is further fixed with a clamp nut 15 so as to be immovable. The clamp nut 15 is fixed by means, for example, of a thread formed on an outer circumferential surface of the clamp nut 15 which engages with a female thread formed at a left end of the anchor disk 11.

Though the loose tube 1d is anchored by a holding force of the compound 7 between the divided pieces 2a and the loose tube 1d, it is more preferable to anchor the loose tube 1d by an holding force between the loose tube 1d and a member coupled with the pressure-resisting cylinder 28, for example, the anchor disk 11.

The optical fibers 1a has already been fixed together with the support rod 32 by the hot-melt type bonding agent 31 and the heat-shrinkable tube 33, thereby forming the anchor portion 30a.

The anchor portion 30a passes through holes 13a, 14a and 15a formed at the centers of the taper pin 13, the flange 14 and the clamp nut 15. The leading end of the support rod 32 has reached inside the pressure-resisting cylinder 28.

The optical fibers 1a are anchored by holding the anchor portion 30a formed on the optical fibers 1a with the anchor disk 11. Needless to say, the anchor portion 30a may be held by a structure recognized as an integral member, for example, by fixing the anchor portion 30a to the anchor disk 11 instead of holding directly by the anchor disk 11.

The optical fibers 1a can be anchored, for example, by fixing a calking sleeve 34 to a left leading end of the support rod 32.

Though the calking sleeve 34 can be fiex to the support rod 32, for example, by calking, the optical fibers can be anchored with optimum tension by calking the calking sleeve 34 after the divided pieces 2a and the steel wires (tension strength wires) 3a and 3b are anchored. Speaking concretely, the calking sleeve 34 is to be fixed in a condition where appropriate tension is applied to the optical fibers by pulling the support rod 32 leftward in the drawing.

The calking sleeve 34 is a nearly cylindrical member which is configured to be fixed by inserting the support rod into a center hole and pressing the calking sleeve 34 to the support rod 32 in a condition where the calking sleeve 34 is deformed, for example, by applying a force from outside.

Figure 11C:
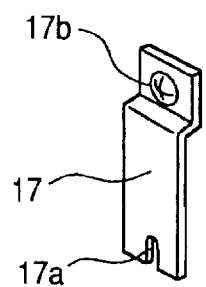

Though the calking sleeve 34 can be anchored (held) by various methods, the calking sleeve 34 is anchored, for example in FIG. 11B, by fixing a support metal implement 17 made of a metal plate shown in FIG. 11C to the anchor disk 11 with a screw 17b, inserting the support rod 32 through a groove 17a at a tip and holding a right end of the calking sleeve 34 by the support metal implement 17.

Speaking of practical working procedures, the calking sleeve 34 is pressed and fixed to the support rod 32 by passing the support rod 32 through the groove 17a of the support metal implement 17 fixed to the anchor disk 11 and calking the calking sleeve 34 at a location where the calking sleeve 34 is in contact with the support metal implement 17 while applying appropriate tension to the optical fibers 1a by way of the anchor portion 30a by pulling a leading end of the support rod 32. The calking sleeve 34 is thereafter held by the support metal implement 17 and anchors the optical fibers 1a continuously.

For a certain configuration of a terminal connecting device, the anchor portion 30a can be held not using the calking sleeve 34 but by holding the right end of the anchor portion 30a by a pressure-resisting cylinder of the terminal connecting device or an equivalent member traced in a chain line as shown on the right side in FIG. 9B.

In this case, the support rod 32 is unnecessary from a dynamical viewpoint. However, it is preferable to insert the support rod 32 which has a length nearly equal to a length L of the anchor portion 30a for maintaining rigidity of the anchor portion 30a.

Figure 12:
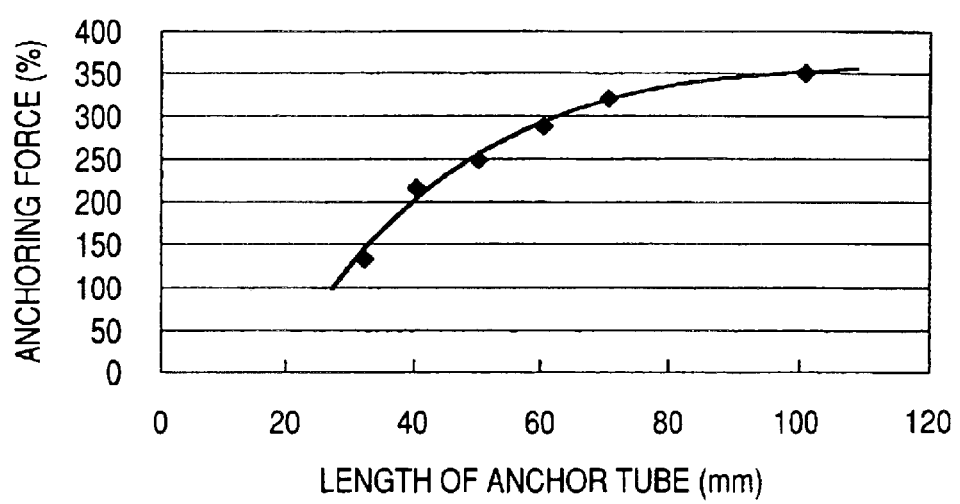
FIG. 12 is a graph illustrating an anchoring capability of the optical fiber anchor device according to the present invention.

Referring to a graph shown in FIG. 12, description will be made of anchoring performance of the anchor device according to the present invention. FIG. 12 shows anchoring forces which are obtained by changing the length L of the anchor portion 30a in FIG. 9. The anchoring forces are calculated taking tension required for elongation of 1% of the optical fibers as 100%.

The anchor device can maintain an anchoring force of 130% when the anchor portion 30a has a length of 30 mm or an anchoring force of 300% when the anchor portion 30a has a length exceeding 60 mm. Since optical fibers to be used for submarine cables generally require screening tests under tension corresponding to elongation of 1% when the cables are to be used under shallow water or 2.2% when the cables are to be used under water 5000 m deep, the anchor device according to the present invention has strength sufficient for use under the shallow water even when the anchor portion 30a has the length of 30 mm or under the deep water when the anchor portion 30a has a length of 60 mm.

In addition, all numbers (total lengths) of optical fibers are subjected to the screening tests under loads corresponding to predetermined elongation and only successful optical fibers are used for cables.

Furthermore, it has been confirmed that no change of a transmission characteristic of optical fibers is caused by applying a load (100%) corresponding to elongation of 1% to the anchor portion 30a of the anchor device according to the present invention.

The hot-melt type bonding agent and the heat-shrinkable tube used for the anchor device according to the present invention originally have achievements of practical use for a long-term as fiber connecting protective sleeves for connecting optical fibers on the way. An ordinary method for connecting optical fibers consists of a step of peeling off sheaths down to primary sheaths of fiber strands of portions to be connected, a step of confirming locations of cores of the fibers and fusing the cores with a fiber splicing device and a step of protecting circumferences of joined portions by covering the portions with a hot-melt type bonding agent and a heat-shrinkable tube. At this time, a steel wire may be laid along the joined portions to cope with an external bending force.

Furthermore, it has been confirmed that no change of a transmission characteristic is caused by a lateral pressure applied to optical fibers from the anchor portion.

Accordingly, it may be considered that durabilities of the hot-melt type bonding agent and the heat-shrinkable tube are guaranteed from a durability of connected portions of optical fibers which are recovered after being laid on a sea bottom and left for a long time.

Since initial performance and long-term stability of the optical fiber anchor device according to the present invention are warranted by experimental results described above and employment achievements of the fiber connecting protective sleeve used in submarine cables, the optical fiber anchor device according to the present invention can be adopted with no fear.

Though description has been made above of an example where the optical fiber anchor device according to the present invention is applied to the submarine optical cables, the optical fiber anchor device according to the present invention is applicable not only to submarine cables but also widely to optical cables to be used on lands.

The optical fiber anchor device according to the present invention does not require a cylindrical winding disk or a linear bonding groove as described above. A conventional device which allows a lower limit of a diameter of an anchor disk to be determined by an allowable bending radius of an optical fiber and makes it difficult to shorten a linear bonding length, thereby enlarging a terminal connecting device, whereas the anchor device according to the present invention makes it possible to limit a linear bonding length within a taper pin, thereby exhibiting an effect to configure a terminal connecting device compact.

Furthermore, a bonding agent which is dried in the vicinity of normal temperature requires a long curing time and special equipment for adopting a UV-curing resin, whereas a hot-melt type bonding agent provides an effect to shorten a working time since the hot-melt type bonding agent can be treated in a short time with no special equipment.

Furthermore, the optical fiber anchor device according to the present invention has a high working property high enough to be helpful to reduce a manufacturing cost since the optical fiber anchor device permits adjusting a positional precision of an anchor portion in a longitudinal direction at a final stage of coupling a calking sleeve with a support rod and allows no problem to be posed by a precision of the anchor portion which is initially somewhat low.

What is claimed is:

1. An optical fiber anchor device installed in a terminal connecting device for connecting an optical cable having a loose tube type unit in which a single optical fiber or a plurality of optical fibers is or are inserted in a cylindrical tube made of a metal or synthetic resin together with a jelly-like filler and used for anchoring the single optical fiber or the plurality of optical fibers inserted in said optical cable, comprising; a hot-melt type bonding agent in a form of a tube having a hollow portion; and a heat-shrinkable tube in a form of a tube having a hollow portion, wherein said hot-melt type bonding agent is inserted into said hollow portion of said heat-shrinkable tube, at least one of said optical fibers is inserted into said hollow portion of said hot-melt type bonding agent and heated, an anchor portion is formed by melting said hot-melt type bonding agent and shrinking said heat-shrinkable tube so as to be integrated with said optical fiber and an end of said anchor portion is held by a fixed portion of said terminal connecting device, whereby said optical fiber is anchored.

2. An optical fiber anchor device installed in a terminal connecting device for connecting an optical cable having a loose tube type unit in which a single optical fiber or a plurality of optical fibers is or are inserted into a cylindrical tube made of a metal or synthetic resin together with a jelly-like filler and used for anchoring the single optical fiber or the plurality of optical fibers inserted in said optical cable, comprising; a hot-melt type bonding agent in a form of a tube having a hollow portion; a heat-shrinkable tube in a form of a tube having a hollow portion; and a support rod that is not formed from an element of said optical cable, wherein said hot-melt type bonding agent is inserted into the hollow portion of said heat-shrinkable tube, said support rod is disposed on said hollow portion, a solid portion or an outer circumferential portion of said hot-melt type bonding agent, at least one of said optical fibers is inserted into said hollow portion of said hot-melt type bonding agent and heated, an anchor portion is formed by melting said hot-melt type bonding agent and shrinking said heat-shrinkable tube so as to be integrated with said support rod and said optical fiber, and an end of said support rod is held by a fixed portion of said terminal connecting device, whereby said optical fiber is anchored.

3. The optical fiber anchor device according to claim 1 or 2, wherein said anchor portion has a length of 30 to 100 mm.

4. The optical fiber anchor device according to claim 1 or 2, wherein said hot-melt type bonding agent is preliminarily inserted into said hollow portion of said heat-shrinkable tube and said hot-melt type bonding agent is joined integrally with said heat-shrinkable tube.

5. The optical fiber anchor device according to claim 2, wherein said support rod is preliminarily fixed to the solid portion of said hot-melt type bonding agent.

6. The optical fiber anchor device according to claim 2, wherein said hot-melt type bonding agent is preliminarily applied to an outer circumferential portion of said support rod.

7. The optical fiber anchor device according to claim 2, wherein a support sleeve is fixed to an end of said support rod which is to be fixed to said terminal connecting device and said support rod is held by said terminal connecting device by way of said support sleeve.

8. The optical fiber anchor device according to claim 2, wherein concavities and convexities are formed on an outer circumferential surface of a portion of said support rod which is to be fixed to said hot-melt type bonding agent.

* * * * *